United States Patent [19]
Abraham

[11] Patent Number: 5,533,753
[45] Date of Patent: Jul. 9, 1996

[54] APPARATUS FOR RESTRAINING A VEHICLE OCCUPANT AND METHOD OF MAKING THE APPARATUS

[75] Inventor: Michelle M. Abraham, Macomb, Mich.

[73] Assignee: TRW Vehicle Safety Systems Inc., Lyndhurst, Ohio

[21] Appl. No.: 382,868

[22] Filed: Feb. 3, 1995

[51] Int. Cl.$^6$ ................................................. B60R 21/30
[52] U.S. Cl. ........................................ 280/739; 280/743.1
[58] Field of Search ................................... 280/739, 743.1

[56] References Cited

U.S. PATENT DOCUMENTS

| | | | |
|---|---|---|---|
| 4,111,458 | 9/1978 | Okada et al. | 280/739 |
| 5,007,662 | 4/1991 | Abramczyk et al. | 280/739 |
| 5,219,179 | 6/1993 | Eyrainer et al. | 280/743.1 |
| 5,249,824 | 10/1993 | Swann et al. | 280/739 |

FOREIGN PATENT DOCUMENTS

| | | | |
|---|---|---|---|
| 4306615 | 9/1994 | Germany | 280/739 |
| 5-319192 | 12/1993 | Japan | 280/739 |

*Primary Examiner*—Kenneth R. Rice
*Attorney, Agent, or Firm*—Tarolli, Sundheim, Covell, Tummino & Szabo

[57] ABSTRACT

An air bag structure for restraining a vehicle occupant comprises air bag material (10) having first and second portions. A rectangular vent opening (16) is defined in the air bag material (10). The rectangular vent opening (16) is defined by folded edges (42) of four triangular flaps (20) of the first portion of air bag material folded over and onto the second portion of air bag material. The flaps (20) are secured in the folded position to the second portion of the air bag material. Preferably, the flaps (20) are secured in the folded position using stitches (22) which extend around the periphery of the rectangular vent opening (16).

9 Claims, 2 Drawing Sheets

APPARATUS FOR RESTRAINING A VEHICLE OCCUPANT AND METHOD OF MAKING THE APPARATUS

BACKGROUND OF THE INVENTION

The present invention relates to an inflatable vehicle occupant restraint, and is particularly directed to an inflatable air bag for use in restraining a vehicle occupant in the event of a collision.

BACKGROUND ART

An inflatable air bag is inflated by inflation fluid directed into the air bag in response to the vehicle experiencing sudden deceleration above a predetermined threshold indicative of a collision. The inflated air bag absorbs energy resulting from the movement of an occupant against the air bag. The energy absorbed by the air bag is dissipated to minimize rebounding of the occupant from the air bag.

One way to dissipate the energy absorbed by the air bag is to vent the inflation fluid from the air bag. It is known to vent the inflation fluid from the air bag through a vent opening. Typically, the vent opening has a circular shape. The vent opening is formed by cutting a circular piece from the material of the air bag. Some known vent openings may be reinforced with a panel sewn to the material of the air bag around the vent opening.

With known vent openings, whether reinforced or not, the edges of the material of the air bag around the vent opening may fray. These edges may fray in part because the method of forming the vent opening produces exposed thread ends around the opening which are contacted by the relatively hot inflation fluid passing from inside the air bag through the vent opening.

SUMMARY OF THE INVENTION

In accordance with one aspect of the present invention, an inflatable air bag is provided for, when inflated, restraining a vehicle occupant during a collision. The air bag comprises air bag material having an outer surface and an inner surface. The inner surface defines a chamber into which inflation fluid is directed to inflate the air bag. The air bag material includes at least one flap portion which is folded over and onto one of the inner and outer surfaces. The folded over portion provides a folded edge portion which defines at least in part an opening for venting inflation fluid from the chamber. Thus, where the folded edge portion is located, there are no exposed thread ends of the air bag material. Securing means is provided for securing the one flap portion to the one of the inner and outer surfaces of the air bag material.

Preferably, the air bag material includes four triangular flap portions which are folded over and onto the inner surface of the air bag material. The four folded edge portions define a rectangular vent opening. Thus, there is a minimum of exposed thread ends at the vent opening. The securing means includes stitches which extend around the periphery of the rectangular vent opening.

In accordance with another aspect of the present invention, a method of forming an air bag from air bag material comprises the steps of creating a cut at a location in the air bag material, folding back a first portion of the air bag material in the vicinity of the cut, and securing the folded back first portion of the air bag material to a surface of the air bag material to create a vent opening between the location of the cut in the air bag material and the folded back first portion of the air bag material.

Preferably, the step of creating a cut includes the step of creating first and second intersecting straight cuts in a first portion of the air bag material to define four triangular flaps in the first portion of the air bag material. The step of folding includes the step of folding each of the triangular flaps along one side of the flap over and onto a second portion of the air bag material to provide a rectangular vent opening in the air bag material defined by folded edge portions of the air bag material. The step of securing includes the step of securing the triangular flaps in the folded position to the second portion of the air bag material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

The present invention is directed to an inflatable air bag for restraining a vehicle occupant when the vehicle experiences a collision requiring air bag deployment. The specific construction of the air bag is not a part of the present invention and may vary.

Figure 1:
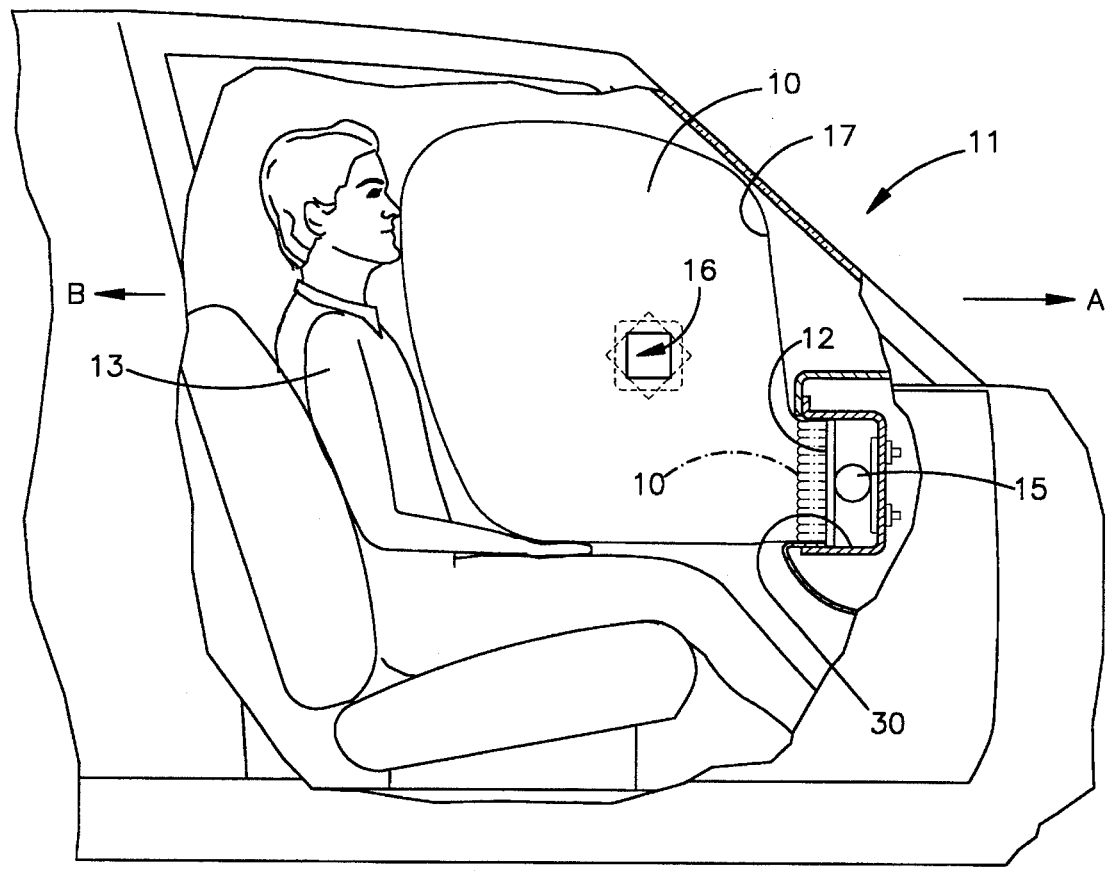
FIG. 1 is a schematic view of a vehicle occupant restraint system including an inflatable air bag constructed in accordance with the present invention.

Referring to FIG. 1, an inflatable air bag 10 (shown in FIG. 1 in solid lines in an inflated condition) is incorporated in a vehicle occupant restraint system 11 for protecting an occupant 13 of a vehicle. The vehicle has a forward direction of travel indicated by an arrow A and a rearward direction of travel indicated by an arrow B. Before inflation of the air bag 10, the air bag 10 is folded and stored in an air bag storage compartment 30 (as shown in FIG. 1 in dashed lines) located in the instrument panel of the vehicle. It is contemplated that the air bag 10 may be folded and stored in an air bag storage compartment at a different location in the vehicle, such as in the vehicle door or in the steering wheel of the vehicle. The folded and stored air bag is in a condition ready for deployment upon occurrence of a vehicle collision requiring air bag deployment.

The material of the air bag 10 is woven and may comprise either coated fabric or uncoated fabric. The woven material of the air bag 10 comprises warp threads and weft threads which extend perpendicular to the warp threads. The air bag 10 has an opening 12 (best shown in FIG. 2) through which inflation fluid flows into the interior 14 of the air bag 10 to inflate the air bag 10. The interior 14 of the air bag 10 is defined at least in part by an inner surface 17 of the air bag 10. An actuatable inflator 15, when actuated, provides the inflation fluid to inflate the air bag 10. Although the opening 12 is shown as rectangular in shape, the opening 12 may be of another shape.

Figure 2:
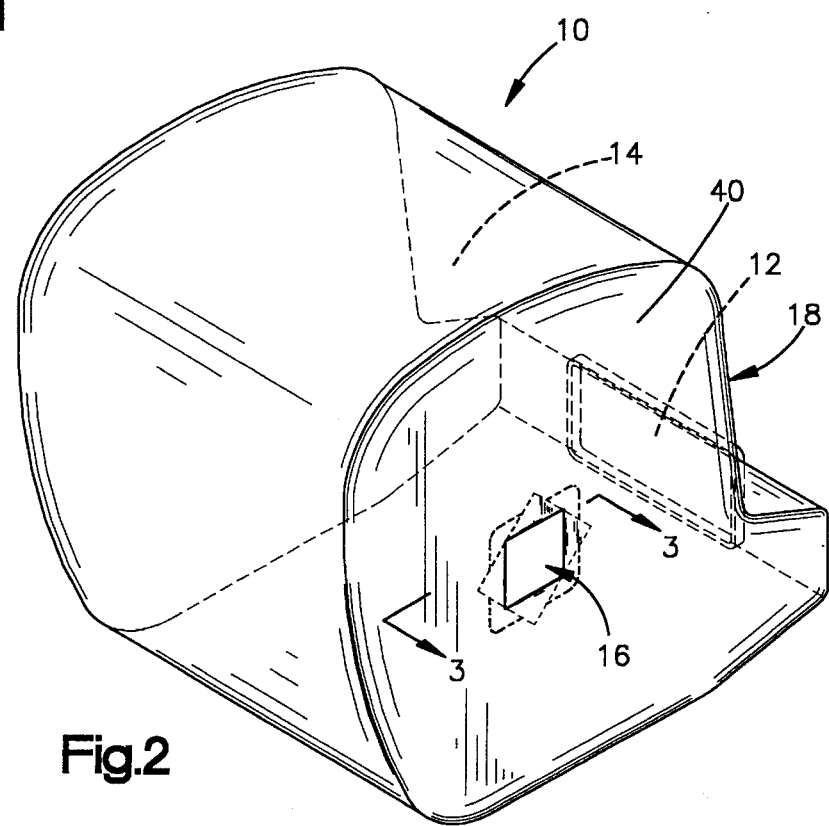
FIG. 2 is a perspective view of the air bag shown in FIG. 1.

Referring to FIG. 2, the air bag 10 has an outer surface 40 and a vent opening 16 located on one side 18 of the air bag 10. The vent opening 16 is rectangular and, more specifically, square in shape. Although only the one vent opening 16 is shown, there could be a number of other vent openings located on the side 18 of the air bag 10. Also, one or more vent openings may be located on the opposite side of the air bag 10 or at some other location on the air bag 10.

Figure 3:
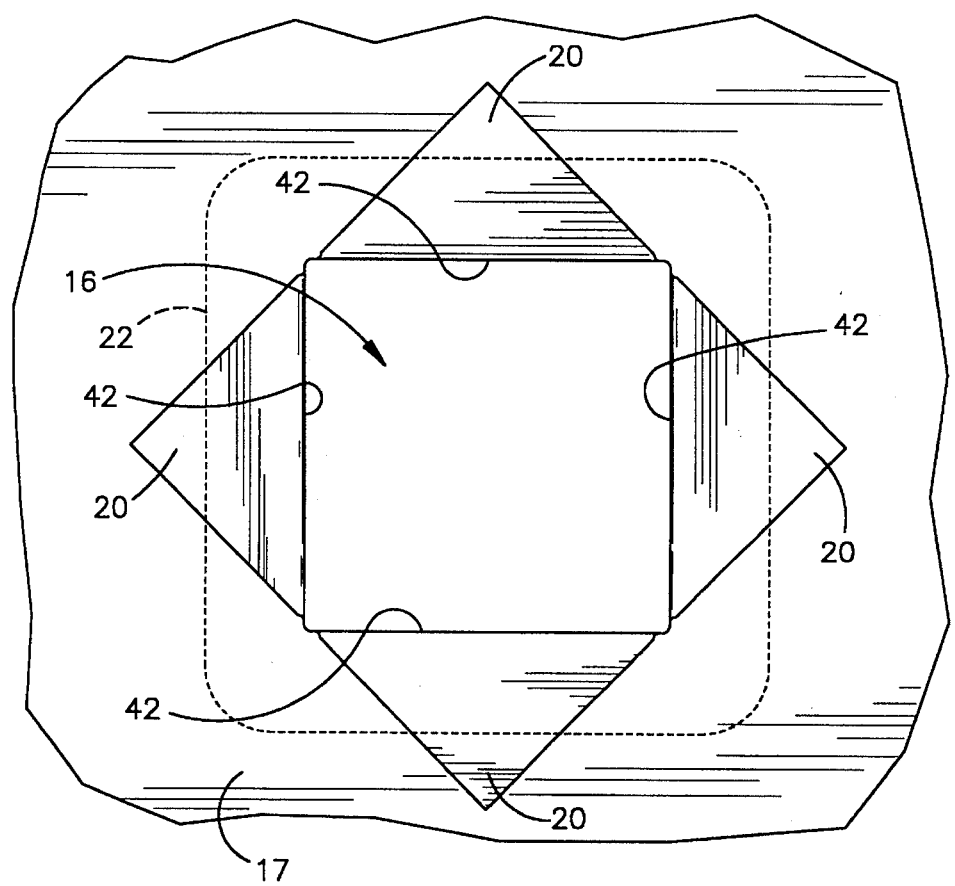
FIG. 3 is an enlarged view taken approximately along line 3—3 of FIG. 2 and showing a vent opening in the air bag.

Referring to FIG. 3, four folded back flap portions 20 of the material of the air bag 10 lie on the inner surface 17 of the air bag 10. Each of the flap portions 20 is triangular and is folded over and back onto the inner surface 17 of the air bag 10. The triangular flap portions 20 are fixedly secured to the inner surface 17 of the air bag 10 with stitches 22 of a suitable thread. The stitches 22 surround the entire perimeter of the vent opening 16 in the air bag 10. More specifically, the stitches 22 extend in a generally rectangular or square pattern around the vent opening 16.

The four triangular flap portions 20 are identical to each other and are located relative to each other as shown in FIG. 3. Preferably, the triangular shape of each of the flap portions 20 has two sides of equal length which form a right angle between the two sides, as shown in FIG. 3. Each of the flap portions 20 is oriented in a direction which is at an angle of 90 degrees relative to the direction in which an adjacent flap portion is oriented. Each of the flap portions 20 has an exposed surface area which is the same as the exposed surface area of the other flap portions 20.

Figure 4:
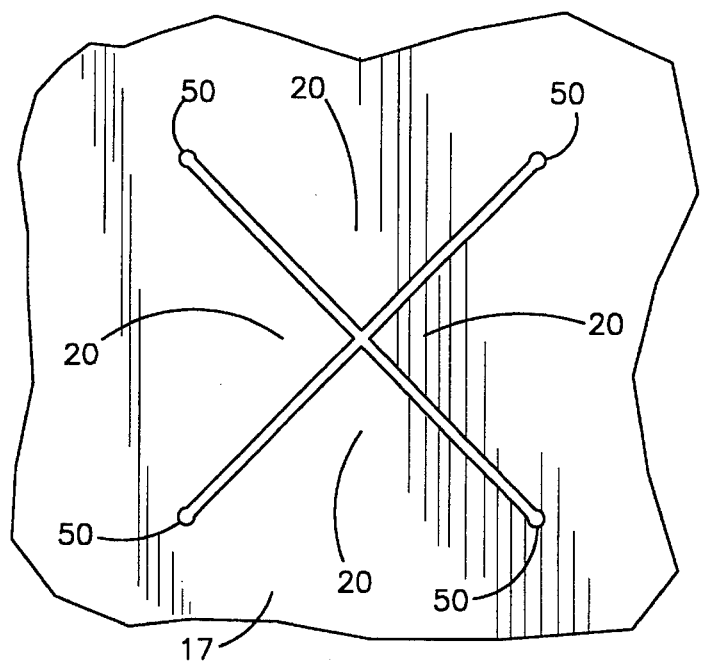
FIG. 4 is a view of material of the air bag of FIG. 3 before the air bag material is folded to form the vent opening.

To form the vent opening 16 of FIG. 3, two intersecting cuts are made in the material of the air bag 10 to form an "X" having four ends or corners 50, as illustrated in FIG. 4. Each of the intersecting cuts extends transverse to the warp threads and the weft threads of the woven material of the air bag 10. Preferably, each cut extends 45 degrees relative to the warp threads and 45 degrees relative to the weft threads. This reduces the tendency of the cuts to "run" and propagate after the cuts have been made in the material of the air bag 10. A laser or a mechanical die, for example, may be used to make the intersecting cuts in the material of the air bag 10. The four corners 50 of the "X" are then rounded (as shown in FIG. 4) by a die cut, for example, to reduce stress concentrations in the area of the corners.

Each of the four triangular flap portions 20 is then folded back onto the inner surface 17 of the material of the air bag 10 to form a double layer of material with a folded edge. The four folded edges 42 define, at least in part, the rectangular vent opening 16. The four triangular flap portions 20 are then stitched to the inner surface 17 of the material of the air bag 10. Each of the folded edges 42 has the same dimension (length) as the other folded edges. Thus, the vent opening 16 is square.

When a vehicle collision requiring air bag deployment occurs, inflation fluid is directed through the opening 12 into the interior 14 of the air bag 10 to inflate the air bag 10, as shown in FIG. 1. The occupant 13 moves forward against the air bag. The air bag 10 absorbs the energy from movement of the occupant 13 against the air bag 10. As the air bag 10 absorbs the energy from movement of the occupant 13 against the air bag 10, the pressure in the interior 14 of the air bag 10 increases. As the pressure in the interior 14 of the air bag increases, inflation fluid in the interior 14 of the air bag 10 flows through the rectangular vent opening 16 to relieve the pressure in the interior 14 of the air bag 10.

An advantage of providing the four folded edges 42 around the vent opening 16 is that there is less exposure in the vent opening 16 of thread ends (cut fabric edges) of the material of the air bag 10. The only exposed thread ends are located at the rounded four corners 50. This reduces the amount of fraying of cut fabric edges, particularly when the relatively hot inflation fluid passes from the interior 14 of the air bag 10 through the vent opening 16. Also, an advantage provided by the four triangular flap portions 20 sewn to the inner surface 17 of the material of the air bag 10 is that the material of the air bag 10 around the vent opening 16 is reinforced without having to sew on a separate reinforcing panel.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An inflatable air bag for, when inflated, restraining a vehicle occupant, said air bag comprising:

air bag material having an outer surface and an inner surface, said inner surface defining a chamber into which inflation fluid is directed to inflate said air bag;

said air bag including a first opening through which inflation fluid is directed into said chamber;

said air bag material including at least one flap portion which is folded over and onto one of said inner and outer surfaces to define at least in part a second opening for venting inflation fluid from said chamber, said second opening being spaced apart from said first opening; and securing means for fixedly securing said at least one flap portion to said one of said inner and outer surfaces of said air bag material.

2. An inflatable air bag according to claim 1 wherein said securing means for fixedly securing said at least one flap portion includes stitches extending around the periphery of said vent opening, said stitches securing said at least one flap portion to said inner surface of said air bag material.

3. An inflatable air bag according to claim 1 wherein said at least one flap portion of said air bag material includes (i) a first flap portion which is folded over and onto one of said inner and outer surfaces to provide a folded edge which defines a part of said second opening and (ii) a second flap portion which is folded over and onto one of said inner and outer surfaces to provide a folded edge which defines another part of said second opening.

4. An inflatable air bag according to claim 3 wherein said air bag material is woven and comprises warp threads and weft threads which extend perpendicular to said weft threads, said second opening being formed by making an X-shaped cut in said air bag material, said X-shaped cut extending at approximately 45° relative to said warp threads and approximately 45° relative to said weft threads.

5. An inflatable air bag according to claim 4 wherein said X-shaped cut has four rounded terminal ends to reduce stress concentrations in the area of each of said terminal ends.

6. A method of forming an air bag from air bag material, the method comprising the steps of:

providing an air bag material which is woven and has warp threads and weft threads which extend perpendicular to the warp threads;

providing an inflation opening through which inflation fluid is directed into the air bag at a first location in the air bag material;

creating a cut at a second location in the air bag material to define four triangular flaps in the air bag material, said first location being spaced apart from said second location;

folding each of the triangular flaps along one side of the flap over and onto an inside surface of the air bag material to create a vent opening through which inflation fluid is vented from the air bag, said vent opening being defined by folded edge portions of the air bag material; and securing the triangular flaps in the folded position to the inside surface of the air bag material.

7. A method according to claim 6 wherein the step of creating a cut in the air bag material includes the step of creating first and second intersecting cuts in the air bag material to form an "X" in the air bag material, the first and second intersecting cuts extending at approximately 45° relative to said warp threads and said weft threads.

8. A method according to claim 7 wherein the step of securing the triangular flaps of the air bag material to the inside surface of the air bag material comprises stitching stitches in a generally square pattern around the vent opening.

9. A method according to claim 8 further comprising the step of rounding the four terminal ends of the "X" in the first portion of the air bag material.

* * * * *